(12) United States Patent
Krucek et al.

(10) Patent No.: US 11,677,875 B2
(45) Date of Patent: Jun. 13, 2023

(54) METHOD AND APPARATUS FOR AUTOMATED QUALITY MANAGEMENT OF COMMUNICATION RECORDS

(71) Applicant: Talkdesk, Inc., San Francisco, CA (US)

(72) Inventors: Kathy Krucek, Barrington, IL (US); Filipe Plàcido, Penela (PT); Nuno Eufrasio, Coimbra (PT); Rui Palma, Figueira-da-Foz (PT); Joao Salgado, Coimbra (PT); Ben Rigby, San Francisco, CA (US); Pedro Andrade, Coimbra (PT); Jason Fama, San Carlos, CA (US)

(73) Assignee: Talkdesk Inc., San Francisco, CA (US)

( * ) Notice: Subject to any disclaimer, the term of this patent is extended or adjusted under 35 U.S.C. 154(b) by 0 days.

(21) Appl. No.: 17/403,120

(22) Filed: Aug. 16, 2021

(65) Prior Publication Data
US 2023/0007124 A1    Jan. 5, 2023

Related U.S. Application Data

(63) Continuation-in-part of application No. 17/366,883, filed on Jul. 2, 2021, now abandoned.

(51) Int. Cl.
*H04M 3/51* (2006.01)
*G06F 40/30* (2020.01)
(Continued)

(52) U.S. Cl.
CPC ........ *H04M 3/5175* (2013.01); *G06F 40/169* (2020.01); *G06F 40/289* (2020.01);
(Continued)

(58) Field of Classification Search
CPC ........ G06F 40/16; G06F 40/289; G06F 40/30; G06F 40/169; G06N 20/00; G10L 15/1815; G10L 15/22; H04M 3/5175
(Continued)

(56) References Cited

U.S. PATENT DOCUMENTS

| 5,862,203 A | 1/1999 | Wulkan et al. |
| 5,897,616 A | 4/1999 | Kanevsky et al. |

(Continued)

FOREIGN PATENT DOCUMENTS

| EP | 1 418 519 A1 | 5/2004 |
| JP | 5986065 B2 | 9/2016 |

(Continued)

OTHER PUBLICATIONS

Aksin et al., "The Modern Call Center: A Multi-Disciplinary Perspective on Operations Management Research", Production and Operations Management, 2007, vol. 16, No. 6, pp. 665-688.
(Continued)

*Primary Examiner* — Harry S Hong
(74) *Attorney, Agent, or Firm* — Rimon PC

(57) ABSTRACT

Disclosed implementations use automated transcription and intent detection and an AI model to evaluate interactions between an agent and a customer within a call center environment. The evaluation flow used for manual evaluations is leveraged so that the evaluators can correct the AI evaluations when appropriate. Based on such corrections, the AI model can be retrained to accommodate specifics of the business and center—resulting in more confidence in the AI model over time.

22 Claims, 7 Drawing Sheets

(51) Int. Cl.
*G10L 15/18* (2013.01)
*G10L 15/22* (2006.01)
*G06F 40/169* (2020.01)
*G06F 40/289* (2020.01)

(52) U.S. Cl.
CPC .......... *G06F 40/30* (2020.01); *G10L 15/1815* (2013.01); *G10L 15/22* (2013.01)

(58) Field of Classification Search
USPC .......................... 379/265.03, 265.07, 265.06
See application file for complete search history.

(56) References Cited

U.S. PATENT DOCUMENTS

| | | |
|---|---|---|
| 5,966,691 A | 10/1999 | Kibre et al. |
| 5,970,124 A | 10/1999 | Csaszar et al. |
| 6,100,891 A | 8/2000 | Thorne |
| 6,128,415 A | 10/2000 | Hultgren et al. |
| 6,163,607 A | 12/2000 | Bogart et al. |
| 6,230,197 B1 | 5/2001 | Beck et al. |
| 6,263,057 B1 | 7/2001 | Silverman |
| 6,345,093 B1 | 2/2002 | Lee et al. |
| 6,385,584 B1 | 5/2002 | McAlister et al. |
| 6,411,687 B1 | 6/2002 | Bohacek et al. |
| 6,493,695 B1 | 12/2002 | Pickering et al. |
| 6,560,222 B1 | 5/2003 | Pounds et al. |
| 6,587,831 B1 | 7/2003 | O'Brien |
| 6,639,982 B1 | 10/2003 | Stuart et al. |
| 6,721,416 B1 | 4/2004 | Farrell |
| 6,754,333 B1 | 6/2004 | Flockhart et al. |
| 6,859,776 B1 | 2/2005 | Cohen et al. |
| 6,970,829 B1 | 11/2005 | Leamon |
| 7,023,979 B1 | 4/2006 | Wu et al. |
| 7,076,047 B1 | 7/2006 | Brennan et al. |
| 7,110,525 B1 | 9/2006 | Heller et al. |
| 7,209,475 B1 | 4/2007 | Shaffer et al. |
| 7,274,787 B1 | 9/2007 | Schoeneberger |
| 7,292,689 B2 | 11/2007 | Odinak et al. |
| 7,343,406 B1 | 3/2008 | Buonanno et al. |
| 7,372,952 B1 | 5/2008 | Wu et al. |
| 7,382,773 B2 | 6/2008 | Schoeneberger et al. |
| 7,409,336 B2 | 8/2008 | Pak et al. |
| 7,426,268 B2 | 9/2008 | Walker et al. |
| 7,466,334 B1 | 12/2008 | Baba |
| 7,537,154 B2 | 5/2009 | Ramachandran |
| 7,634,422 B1 | 12/2009 | Andre et al. |
| 7,657,263 B1 | 2/2010 | Chahrouri |
| 7,672,746 B1 | 3/2010 | Hamilton et al. |
| 7,672,845 B2 | 3/2010 | Beranek et al. |
| 7,676,034 B1 | 3/2010 | Wu et al. |
| 7,698,163 B2 | 4/2010 | Reed et al. |
| 7,752,159 B2 | 7/2010 | Nelken et al. |
| 7,774,790 B1 | 8/2010 | Jirman et al. |
| 7,788,286 B2 | 8/2010 | Nourbakhsh et al. |
| 7,853,006 B1 | 12/2010 | Fama et al. |
| 7,864,946 B1 | 1/2011 | Fama et al. |
| 7,869,998 B1 | 1/2011 | Di Fabbrizio et al. |
| 7,949,123 B1 | 5/2011 | Flockhart et al. |
| 7,953,219 B2 | 5/2011 | Freedman et al. |
| 7,966,369 B1 | 6/2011 | Briere et al. |
| 8,060,394 B2 | 11/2011 | Woodings et al. |
| 8,073,129 B1 | 12/2011 | Kalavar |
| 8,116,446 B1 | 2/2012 | Kalavar |
| 8,135,125 B2 | 3/2012 | Sidhu et al. |
| 8,160,233 B2 | 4/2012 | Keren et al. |
| 8,184,782 B1 | 5/2012 | Vatland et al. |
| 8,223,951 B1 | 7/2012 | Edelhaus et al. |
| 8,229,761 B2 | 7/2012 | Backhaus et al. |
| 8,243,896 B1 | 8/2012 | Rae |
| 8,300,798 B1 | 10/2012 | Wu et al. |
| 8,369,338 B1 | 2/2013 | Peng et al. |
| 8,370,155 B2 | 2/2013 | Byrd et al. |
| 8,391,466 B1 | 3/2013 | Noble, Jr. |
| 8,447,279 B1 | 5/2013 | Peng et al. |
| 8,488,769 B1 | 7/2013 | Noble et al. |
| 8,526,576 B1 | 9/2013 | Deich et al. |
| 8,583,466 B2 | 11/2013 | Margulies et al. |
| 8,594,306 B2 | 11/2013 | Laredo et al. |
| 8,626,137 B1 | 1/2014 | Devitt et al. |
| 8,635,226 B2 | 1/2014 | Chang et al. |
| 8,644,489 B1 | 2/2014 | Noble et al. |
| 8,671,020 B1 | 3/2014 | Morrison et al. |
| 8,688,557 B2 | 4/2014 | Rose et al. |
| 8,738,739 B2 | 5/2014 | Makar et al. |
| 8,767,948 B1 | 7/2014 | Riahi et al. |
| 8,811,597 B1 | 8/2014 | Hackbarth et al. |
| 8,861,691 B1 | 10/2014 | De et al. |
| 8,869,245 B2 | 10/2014 | Ranganathan et al. |
| 8,898,219 B2 | 11/2014 | Ricci |
| 8,898,290 B2 | 11/2014 | Siemsgluess |
| 8,909,693 B2 | 12/2014 | Frissora et al. |
| 8,935,172 B1 | 1/2015 | Noble, Jr. et al. |
| 8,996,509 B1 | 3/2015 | Sundaram |
| 9,020,142 B2 | 4/2015 | Kosiba et al. |
| 9,026,431 B1 | 5/2015 | Moreno Mengibar et al. |
| 9,060,057 B1 | 6/2015 | Danis |
| 9,065,915 B1 | 6/2015 | Lillard et al. |
| 9,082,094 B1 | 7/2015 | Etter et al. |
| 9,100,483 B1 | 8/2015 | Snedden |
| 9,117,450 B2 | 8/2015 | Cook et al. |
| 9,123,009 B1 | 9/2015 | Etter et al. |
| 9,137,366 B2 | 9/2015 | Medina et al. |
| 9,152,737 B1 | 10/2015 | Micali et al. |
| 9,160,853 B1 | 10/2015 | Daddi et al. |
| 9,178,999 B1 | 11/2015 | Hedge et al. |
| 9,185,222 B1 | 11/2015 | Govindarajan et al. |
| 9,237,232 B1 | 1/2016 | Williams et al. |
| 9,280,754 B1 | 3/2016 | Schwartz et al. |
| 9,286,413 B1 | 3/2016 | Coates et al. |
| 9,300,801 B1 | 3/2016 | Warford et al. |
| 9,319,524 B1 | 4/2016 | Webster |
| 9,386,152 B2 | 7/2016 | Riahi et al. |
| 9,397,985 B1 | 7/2016 | Seger et al. |
| 9,426,291 B1 | 8/2016 | Ouimette et al. |
| 9,473,637 B1 | 10/2016 | Venkatapathy et al. |
| 9,514,463 B2 | 12/2016 | Grigg et al. |
| 9,595,049 B2 | 3/2017 | Showers et al. |
| 9,609,131 B2 | 3/2017 | Placiakis et al. |
| 9,674,361 B2 | 6/2017 | Ristock et al. |
| 9,679,265 B1 | 6/2017 | Schwartz et al. |
| 9,774,731 B1 | 9/2017 | Haltom et al. |
| 9,787,840 B1 | 10/2017 | Neuer, III et al. |
| 9,813,495 B1 | 11/2017 | Van et al. |
| 9,823,949 B2 | 11/2017 | Ristock et al. |
| 9,883,037 B1 | 1/2018 | Lewis et al. |
| 9,894,478 B1 | 2/2018 | Deluca et al. |
| 9,930,181 B1 | 3/2018 | Moran et al. |
| 9,955,021 B1 | 4/2018 | Liu et al. |
| RE46,852 E | 5/2018 | Petrovykh |
| 9,998,596 B1 | 6/2018 | Dunmire et al. |
| 10,009,465 B1 | 6/2018 | Fang et al. |
| 10,038,788 B1 | 7/2018 | Khalatian |
| 10,044,862 B1 | 8/2018 | Cai et al. |
| 10,079,939 B1 | 9/2018 | Bostick et al. |
| 10,085,073 B2 | 9/2018 | Ray et al. |
| 10,101,974 B2 | 10/2018 | Ristock et al. |
| 10,115,065 B1 | 10/2018 | Fama et al. |
| 10,135,973 B2 | 11/2018 | Algard et al. |
| 10,154,138 B2 | 12/2018 | Te Booij et al. |
| 10,194,027 B1 | 1/2019 | Daddi et al. |
| 10,235,999 B1 | 3/2019 | Naughton et al. |
| 10,241,752 B2 | 3/2019 | Lemay et al. |
| 10,242,019 B1 | 3/2019 | Shan et al. |
| 10,276,170 B2 | 4/2019 | Gruber et al. |
| 10,277,745 B1 | 4/2019 | Araujo et al. |
| 10,290,017 B2 | 5/2019 | Traasdahl et al. |
| 10,331,402 B1 | 6/2019 | Spector et al. |
| 10,380,246 B2 | 8/2019 | Clark et al. |
| 10,440,180 B1 | 10/2019 | Jayapalan et al. |
| 10,445,742 B2 | 10/2019 | Prendki et al. |
| 10,460,728 B2 | 10/2019 | Anbazhagan et al. |
| 10,497,361 B1 | 12/2019 | Rule et al. |
| 10,554,590 B2 | 2/2020 | Cabrera-Cordon et al. |

(56) References Cited

U.S. PATENT DOCUMENTS

| | | |
|---|---|---|
| 10,554,817 B1 | 2/2020 | Sullivan et al. |
| 10,572,879 B1 | 2/2020 | Hunter et al. |
| 10,574,822 B1 | 2/2020 | Sheshaiahgari et al. |
| 10,601,992 B2 | 3/2020 | Dwyer et al. |
| 10,623,572 B1 | 4/2020 | Copeland |
| 10,635,973 B1 | 4/2020 | Dirac et al. |
| 10,636,425 B2 | 4/2020 | Naughton et al. |
| 10,699,303 B2 | 6/2020 | Ismail et al. |
| 10,715,648 B1 | 7/2020 | Vashisht et al. |
| 10,718,031 B1 | 7/2020 | Wu et al. |
| 10,728,384 B1 | 7/2020 | Channakeshava et al. |
| 10,735,586 B1 | 8/2020 | Johnston |
| 10,742,806 B2 | 8/2020 | Kotak |
| 10,750,019 B1 | 8/2020 | Petrovykh et al. |
| 10,783,568 B1 | 9/2020 | Chandra et al. |
| 10,789,956 B1 | 9/2020 | Dube |
| 10,803,865 B2 | 10/2020 | Naughton et al. |
| 10,812,654 B2 | 10/2020 | Wozniak |
| 10,812,655 B1 | 10/2020 | Adibi et al. |
| 10,827,069 B1 | 11/2020 | Paiva |
| 10,827,071 B1 | 11/2020 | Adibi et al. |
| 10,839,432 B1 | 11/2020 | Konig et al. |
| 10,841,425 B1 | 11/2020 | Langley et al. |
| 10,855,844 B1 | 12/2020 | Smith et al. |
| 10,861,031 B2 | 12/2020 | Sullivan et al. |
| 10,878,479 B2 | 12/2020 | Wu et al. |
| 10,943,589 B2 | 3/2021 | Naughton et al. |
| 10,970,682 B1 | 4/2021 | Aykin |
| 11,017,176 B2 | 5/2021 | Ayers et al. |
| 11,089,158 B1 | 8/2021 | Holland et al. |
| 2001/0008999 A1 | 7/2001 | Bull |
| 2001/0024497 A1 | 9/2001 | Campbell |
| 2001/0054072 A1 | 12/2001 | Discolo et al. |
| 2002/0019737 A1 | 2/2002 | Stuart et al. |
| 2002/0029272 A1 | 3/2002 | Weller |
| 2002/0034304 A1 | 3/2002 | Yang |
| 2002/0038420 A1 | 3/2002 | Collins et al. |
| 2002/0067823 A1 | 6/2002 | Walker et al. |
| 2002/0143599 A1 | 10/2002 | Nourbakhsh et al. |
| 2002/0169664 A1 | 11/2002 | Walker et al. |
| 2002/0174182 A1 | 11/2002 | Wilkinson et al. |
| 2002/0181689 A1 | 12/2002 | Rupe et al. |
| 2003/0007621 A1 | 1/2003 | Graves et al. |
| 2003/0009520 A1 | 1/2003 | Nourbakhsh et al. |
| 2003/0032409 A1 | 2/2003 | Hutcheson et al. |
| 2003/0061068 A1 | 3/2003 | Curtis |
| 2003/0112927 A1 | 6/2003 | Brown et al. |
| 2003/0126136 A1 | 7/2003 | Omoigui |
| 2003/0167167 A1 | 9/2003 | Gong |
| 2004/0044585 A1 | 3/2004 | Franco |
| 2004/0044664 A1 | 3/2004 | Cash et al. |
| 2004/0062364 A1 | 4/2004 | Dezonno et al. |
| 2004/0078257 A1 | 4/2004 | Schweitzer et al. |
| 2004/0098274 A1 | 5/2004 | Dezonno et al. |
| 2004/0103051 A1 | 5/2004 | Reed et al. |
| 2004/0141508 A1 | 7/2004 | Schoeneberger et al. |
| 2004/0162724 A1 | 8/2004 | Hill et al. |
| 2004/0162753 A1 | 8/2004 | Vogel et al. |
| 2004/0174980 A1 | 9/2004 | Knott et al. |
| 2004/0215451 A1 | 10/2004 | MacLeod |
| 2005/0033957 A1 | 2/2005 | Enokida |
| 2005/0043986 A1 | 2/2005 | Mcconnell et al. |
| 2005/0063365 A1 | 3/2005 | Mathew et al. |
| 2005/0071178 A1 | 3/2005 | Beckstrom et al. |
| 2005/0105712 A1 | 5/2005 | Williams et al. |
| 2005/0177368 A1 | 8/2005 | Odinak et al. |
| 2005/0226220 A1 | 10/2005 | Kilkki et al. |
| 2005/0228774 A1 | 10/2005 | Ronnewinkel |
| 2005/0246511 A1 | 11/2005 | Willman et al. |
| 2005/0271198 A1 | 12/2005 | Chin et al. |
| 2006/0095575 A1 | 5/2006 | Sureka et al. |
| 2006/0126818 A1 | 6/2006 | Berger et al. |
| 2006/0153357 A1 | 7/2006 | Acharya et al. |
| 2006/0166669 A1 | 7/2006 | Claussen |
| 2006/0188086 A1 | 8/2006 | Busey et al. |
| 2006/0209797 A1 | 9/2006 | Anisimov et al. |
| 2006/0215831 A1 | 9/2006 | Knott et al. |
| 2006/0229931 A1 | 10/2006 | Fligler et al. |
| 2006/0256953 A1 | 11/2006 | Pulaski et al. |
| 2006/0271361 A1 | 11/2006 | Vora et al. |
| 2006/0274856 A1 | 12/2006 | Dun et al. |
| 2006/0277108 A1 | 12/2006 | Altberg et al. |
| 2007/0016565 A1 | 1/2007 | Evans et al. |
| 2007/0036334 A1 | 2/2007 | Culbertson et al. |
| 2007/0038499 A1 | 2/2007 | Margulies et al. |
| 2007/0041519 A1 | 2/2007 | Erhart et al. |
| 2007/0061183 A1 | 3/2007 | Seetharaman et al. |
| 2007/0078725 A1 | 4/2007 | Koszewski et al. |
| 2007/0121902 A1 | 5/2007 | Stoica et al. |
| 2007/0121903 A1 | 5/2007 | Moore, Jr. et al. |
| 2007/0136284 A1 | 6/2007 | Cobb et al. |
| 2007/0155411 A1 | 7/2007 | Morrison |
| 2007/0157021 A1 | 7/2007 | Whitfield |
| 2007/0160188 A1 | 7/2007 | Sharpe et al. |
| 2007/0162296 A1 | 7/2007 | Altberg et al. |
| 2007/0198329 A1 | 8/2007 | Lyerly et al. |
| 2007/0201636 A1 | 8/2007 | Gilbert et al. |
| 2007/0263810 A1 | 11/2007 | Sterns |
| 2007/0265990 A1 | 11/2007 | Sidhu et al. |
| 2007/0269031 A1 | 11/2007 | Honig et al. |
| 2007/0280460 A1 | 12/2007 | Harris et al. |
| 2007/0287430 A1 | 12/2007 | Hosain et al. |
| 2008/0002823 A1 | 1/2008 | Fama et al. |
| 2008/0043976 A1 | 2/2008 | Maximo et al. |
| 2008/0065902 A1 | 3/2008 | Spohrer et al. |
| 2008/0095355 A1 | 4/2008 | Mahalaha et al. |
| 2008/0126957 A1 | 5/2008 | Tysowski et al. |
| 2008/0205620 A1 | 8/2008 | Odinak et al. |
| 2008/0225872 A1 | 9/2008 | Collins et al. |
| 2008/0254774 A1 | 10/2008 | Lee |
| 2008/0255944 A1 | 10/2008 | Shah et al. |
| 2008/0260138 A1 | 10/2008 | Chen et al. |
| 2008/0288770 A1 | 11/2008 | Kline et al. |
| 2008/0300955 A1 | 12/2008 | Hamilton et al. |
| 2009/0018996 A1 | 1/2009 | Hunt et al. |
| 2009/0080411 A1 | 3/2009 | Lyman |
| 2009/0086945 A1 | 4/2009 | Buchanan et al. |
| 2009/0086949 A1 | 4/2009 | Caspi et al. |
| 2009/0086953 A1 | 4/2009 | Vendrow |
| 2009/0110182 A1 | 4/2009 | Knight, Jr. et al. |
| 2009/0171164 A1 | 7/2009 | Jung et al. |
| 2009/0222551 A1 | 9/2009 | Neely et al. |
| 2009/0228264 A1 | 9/2009 | Williams et al. |
| 2009/0234710 A1 | 9/2009 | Belgaied et al. |
| 2009/0234732 A1 | 9/2009 | Zorman et al. |
| 2009/0245479 A1 | 10/2009 | Surendran |
| 2009/0285384 A1 | 11/2009 | Pollock et al. |
| 2009/0306981 A1 | 12/2009 | Cromack et al. |
| 2009/0307052 A1 | 12/2009 | Mankani et al. |
| 2010/0106568 A1 | 4/2010 | Grimes |
| 2010/0114646 A1 | 5/2010 | Mcilwain et al. |
| 2010/0189250 A1 | 7/2010 | Williams et al. |
| 2010/0211515 A1 | 8/2010 | Woodings et al. |
| 2010/0235341 A1 | 9/2010 | Bennett |
| 2010/0250196 A1 | 9/2010 | Lawler et al. |
| 2010/0262549 A1 | 10/2010 | Kannan et al. |
| 2010/0266115 A1 | 10/2010 | Fedorov et al. |
| 2010/0266116 A1 | 10/2010 | Stolyar et al. |
| 2010/0274618 A1 | 10/2010 | Byrd et al. |
| 2010/0287131 A1 | 11/2010 | Church |
| 2010/0293033 A1 | 11/2010 | Hall et al. |
| 2010/0299268 A1 | 11/2010 | Guha et al. |
| 2010/0332287 A1 | 12/2010 | Gates et al. |
| 2011/0014932 A1 | 1/2011 | Estevez |
| 2011/0022461 A1 | 1/2011 | Simeonov |
| 2011/0071870 A1 | 3/2011 | Gong |
| 2011/0077994 A1 | 3/2011 | Segev et al. |
| 2011/0082688 A1 | 4/2011 | Kim et al. |
| 2011/0116618 A1 | 5/2011 | Zyarko et al. |
| 2011/0125697 A1 | 5/2011 | Erhart et al. |
| 2011/0143323 A1 | 6/2011 | Cohen |
| 2011/0182283 A1 | 7/2011 | Van et al. |
| 2011/0185293 A1 | 7/2011 | Barnett et al. |
| 2011/0216897 A1 | 9/2011 | Laredo et al. |

(56) References Cited

U.S. PATENT DOCUMENTS

| | | |
|---|---|---|
| 2011/0264581 A1 | 10/2011 | Clyne |
| 2011/0267985 A1 | 11/2011 | Wilkinson et al. |
| 2011/0286592 A1 | 11/2011 | Nimmagadda |
| 2011/0288897 A1 | 11/2011 | Erhart et al. |
| 2012/0046996 A1 | 2/2012 | Shah et al. |
| 2012/0051537 A1 | 3/2012 | Chishti et al. |
| 2012/0084217 A1 | 4/2012 | Kohler et al. |
| 2012/0087486 A1 | 4/2012 | Guerrero et al. |
| 2012/0095835 A1 | 4/2012 | Makar et al. |
| 2012/0109830 A1 | 5/2012 | Vogel |
| 2012/0257116 A1 | 10/2012 | Hendrickson et al. |
| 2012/0265587 A1 | 10/2012 | Kinkead |
| 2012/0290373 A1 | 11/2012 | Ferzacca et al. |
| 2012/0321073 A1 | 12/2012 | Flockhart et al. |
| 2013/0023235 A1 | 1/2013 | Fan et al. |
| 2013/0073361 A1 | 3/2013 | Silver |
| 2013/0085785 A1 | 4/2013 | Rogers et al. |
| 2013/0090963 A1 | 4/2013 | Sharma et al. |
| 2013/0124361 A1 | 5/2013 | Bryson |
| 2013/0136252 A1 | 5/2013 | Kosiba et al. |
| 2013/0223608 A1 | 8/2013 | Flockhart et al. |
| 2013/0236002 A1 | 9/2013 | Jennings et al. |
| 2013/0257877 A1 | 10/2013 | Davis |
| 2013/0304581 A1 | 11/2013 | Soroca et al. |
| 2013/0325972 A1 | 12/2013 | Boston et al. |
| 2014/0012603 A1 | 1/2014 | Scanlon et al. |
| 2014/0016762 A1 | 1/2014 | Mitchell et al. |
| 2014/0039944 A1 | 2/2014 | Humbert et al. |
| 2014/0039962 A1 | 2/2014 | Nudd et al. |
| 2014/0067375 A1 | 3/2014 | Wooters |
| 2014/0079195 A1 | 3/2014 | Srivastava et al. |
| 2014/0079207 A1 | 3/2014 | Zhakov et al. |
| 2014/0099916 A1 | 4/2014 | Mallikarjunan et al. |
| 2014/0101261 A1 | 4/2014 | Wu et al. |
| 2014/0136346 A1 | 5/2014 | Chris |
| 2014/0140494 A1 | 5/2014 | Zhakov |
| 2014/0143018 A1 | 5/2014 | Nies et al. |
| 2014/0143249 A1 | 5/2014 | Cazzanti et al. |
| 2014/0161241 A1 | 6/2014 | Baranovsky et al. |
| 2014/0164502 A1 | 6/2014 | Khodorenko et al. |
| 2014/0177819 A1 | 6/2014 | Vymenets et al. |
| 2014/0188477 A1 | 7/2014 | Zhang |
| 2014/0200988 A1 | 7/2014 | Kassko et al. |
| 2014/0219132 A1 | 8/2014 | Delveaux et al. |
| 2014/0219438 A1 | 8/2014 | Brown et al. |
| 2014/0233719 A1 | 8/2014 | Vymenets et al. |
| 2014/0244712 A1 | 8/2014 | Walters et al. |
| 2014/0254790 A1 | 9/2014 | Shaffer et al. |
| 2014/0257908 A1 | 9/2014 | Steiner et al. |
| 2014/0270108 A1 | 9/2014 | Riahi et al. |
| 2014/0270138 A1 | 9/2014 | Uba et al. |
| 2014/0270142 A1 | 9/2014 | Bischoff et al. |
| 2014/0270145 A1 | 9/2014 | Erhart et al. |
| 2014/0278605 A1 | 9/2014 | Borucki et al. |
| 2014/0278649 A1 | 9/2014 | Guerinik et al. |
| 2014/0279045 A1 | 9/2014 | Shottan et al. |
| 2014/0279050 A1 | 9/2014 | Makar et al. |
| 2014/0314225 A1 | 10/2014 | Riahi et al. |
| 2014/0335480 A1 | 11/2014 | Asenjo et al. |
| 2014/0372171 A1 | 12/2014 | Martin et al. |
| 2014/0379424 A1 | 12/2014 | Shroff |
| 2015/0006400 A1 | 1/2015 | Eng et al. |
| 2015/0010134 A1 | 1/2015 | Erel et al. |
| 2015/0012278 A1 | 1/2015 | Metcalf |
| 2015/0016600 A1 | 1/2015 | Desai et al. |
| 2015/0023484 A1 | 1/2015 | Ni et al. |
| 2015/0030151 A1 | 1/2015 | Bellini et al. |
| 2015/0030152 A1 | 1/2015 | Waxman et al. |
| 2015/0051957 A1 | 2/2015 | Griebeler et al. |
| 2015/0066632 A1 | 3/2015 | Gonzalez et al. |
| 2015/0071418 A1 | 3/2015 | Shaffer et al. |
| 2015/0078538 A1 | 3/2015 | Jain |
| 2015/0100473 A1 | 4/2015 | Manoharan et al. |
| 2015/0127400 A1 | 5/2015 | Chan et al. |
| 2015/0127441 A1 | 5/2015 | Feldman |
| 2015/0127677 A1 | 5/2015 | Wang et al. |
| 2015/0142704 A1 | 5/2015 | London |
| 2015/0172463 A1 | 6/2015 | Quast et al. |
| 2015/0178371 A1 | 6/2015 | Seth et al. |
| 2015/0195406 A1 | 7/2015 | Dwyer et al. |
| 2015/0213454 A1 | 7/2015 | Vedula |
| 2015/0215464 A1 | 7/2015 | Shaffer et al. |
| 2015/0222751 A1 | 8/2015 | Odinak et al. |
| 2015/0256677 A1 | 9/2015 | Konig et al. |
| 2015/0262188 A1 | 9/2015 | Franco |
| 2015/0262208 A1 | 9/2015 | Bjontegard et al. |
| 2015/0269377 A1 | 9/2015 | Gaddipati |
| 2015/0271334 A1 | 9/2015 | Wawrzynowicz |
| 2015/0281445 A1 | 10/2015 | Kumar et al. |
| 2015/0281449 A1 | 10/2015 | Milstein et al. |
| 2015/0281450 A1 | 10/2015 | Shapiro et al. |
| 2015/0281454 A1 | 10/2015 | Milstein et al. |
| 2015/0287410 A1 | 10/2015 | Mengibar et al. |
| 2015/0295788 A1 | 10/2015 | Witzman et al. |
| 2015/0296081 A1 | 10/2015 | Jeong |
| 2015/0334230 A1 | 11/2015 | Volzke |
| 2015/0339446 A1 | 11/2015 | Sperling et al. |
| 2015/0339620 A1 | 11/2015 | Esposito et al. |
| 2015/0339769 A1 | 11/2015 | Deoliveira et al. |
| 2015/0347900 A1 | 12/2015 | Bell et al. |
| 2015/0350429 A1 | 12/2015 | Kumar et al. |
| 2015/0350440 A1 | 12/2015 | Steiner et al. |
| 2015/0350443 A1 | 12/2015 | Kumar et al. |
| 2015/0379562 A1 | 12/2015 | Spievak et al. |
| 2016/0026629 A1 | 1/2016 | Clifford et al. |
| 2016/0034260 A1 | 2/2016 | Ristock et al. |
| 2016/0034995 A1 | 2/2016 | Williams et al. |
| 2016/0036981 A1 | 2/2016 | Hollenberg et al. |
| 2016/0036983 A1 | 2/2016 | Korolev et al. |
| 2016/0042419 A1 | 2/2016 | Singh |
| 2016/0042749 A1 | 2/2016 | Hirose |
| 2016/0055499 A1 | 2/2016 | Hawkins et al. |
| 2016/0057284 A1 | 2/2016 | Nagpal et al. |
| 2016/0065739 A1 | 3/2016 | Brimshan et al. |
| 2016/0080567 A1 | 3/2016 | Hooshiari et al. |
| 2016/0085891 A1 | 3/2016 | Ter et al. |
| 2016/0112867 A1 | 4/2016 | Martinez |
| 2016/0124937 A1 | 5/2016 | Elhaddad |
| 2016/0125456 A1 | 5/2016 | Wu et al. |
| 2016/0134624 A1 | 5/2016 | Jacobson et al. |
| 2016/0140627 A1 | 5/2016 | Moreau et al. |
| 2016/0150086 A1 | 5/2016 | Pickford |
| 2016/0155080 A1 | 6/2016 | Gnanasambandam et al. |
| 2016/0173692 A1 | 6/2016 | Wicaksono et al. |
| 2016/0180381 A1 | 6/2016 | Kaiser et al. |
| 2016/0191699 A1 | 6/2016 | Agrawal et al. |
| 2016/0191709 A1 | 6/2016 | Pullamplavil et al. |
| 2016/0191712 A1 | 6/2016 | Bouzid et al. |
| 2016/0234386 A1 | 8/2016 | Wawrzynowicz |
| 2016/0247165 A1 | 8/2016 | Ryabchun et al. |
| 2016/0261747 A1 | 8/2016 | Thirugnanasundaram et al. |
| 2016/0295018 A1 | 10/2016 | Loftus et al. |
| 2016/0300573 A1 | 10/2016 | Carbune et al. |
| 2016/0335576 A1 | 11/2016 | Peng |
| 2016/0349960 A1 | 12/2016 | Kumar et al. |
| 2016/0358611 A1 | 12/2016 | Abel |
| 2016/0360033 A1 | 12/2016 | Kocan |
| 2016/0378569 A1 | 12/2016 | Ristock et al. |
| 2016/0381222 A1 | 12/2016 | Ristock et al. |
| 2017/0004178 A1 | 1/2017 | Ponting et al. |
| 2017/0006135 A1 | 1/2017 | Siebel et al. |
| 2017/0006161 A9 | 1/2017 | Riahi et al. |
| 2017/0011311 A1 | 1/2017 | Backer et al. |
| 2017/0024762 A1 | 1/2017 | Swaminathan |
| 2017/0032436 A1 | 2/2017 | Disalvo et al. |
| 2017/0034226 A1 | 2/2017 | Bostick et al. |
| 2017/0068436 A1 | 3/2017 | Auer et al. |
| 2017/0068854 A1 | 3/2017 | Markiewicz et al. |
| 2017/0098197 A1 | 4/2017 | Yu et al. |
| 2017/0104875 A1 | 4/2017 | Im et al. |
| 2017/0111505 A1 | 4/2017 | Mcgann et al. |
| 2017/0111509 A1 | 4/2017 | McGann et al. |
| 2017/0116173 A1 | 4/2017 | Lev-Tov et al. |
| 2017/0118336 A1 | 4/2017 | Tapuhi et al. |

(56) References Cited

U.S. PATENT DOCUMENTS

| | | |
|---|---|---|
| 2017/0132536 A1 | 5/2017 | Goldstein et al. |
| 2017/0148073 A1 | 5/2017 | Nomula et al. |
| 2017/0155766 A1 | 6/2017 | Kumar et al. |
| 2017/0161439 A1 | 6/2017 | Raduchel et al. |
| 2017/0162197 A1 | 6/2017 | Cohen |
| 2017/0169325 A1 | 6/2017 | McCord et al. |
| 2017/0207916 A1 | 7/2017 | Luce et al. |
| 2017/0214795 A1 | 7/2017 | Charlson |
| 2017/0220966 A1 | 8/2017 | Wang |
| 2017/0223070 A1 | 8/2017 | Lin |
| 2017/0236512 A1 | 8/2017 | Williams et al. |
| 2017/0286774 A1 | 10/2017 | Gaidon |
| 2017/0288866 A1 | 10/2017 | Vanek et al. |
| 2017/0308794 A1 | 10/2017 | Fischerstrom |
| 2017/0316386 A1 | 11/2017 | Joshi et al. |
| 2017/0323344 A1 | 11/2017 | Nigul |
| 2017/0337578 A1 | 11/2017 | Chittilappilly et al. |
| 2017/0344754 A1 | 11/2017 | Kumar et al. |
| 2017/0344988 A1 | 11/2017 | Cusden et al. |
| 2017/0359421 A1 | 12/2017 | Stoops et al. |
| 2017/0372436 A1 | 12/2017 | Dalal et al. |
| 2018/0018705 A1 | 1/2018 | Tognetti |
| 2018/0032997 A1 | 2/2018 | Gordon et al. |
| 2018/0052664 A1 | 2/2018 | Zhang et al. |
| 2018/0053401 A1 | 2/2018 | Martin et al. |
| 2018/0054464 A1 | 2/2018 | Zhang et al. |
| 2018/0060830 A1 | 3/2018 | Abramovici et al. |
| 2018/0061256 A1 | 3/2018 | Elchik et al. |
| 2018/0077088 A1 | 3/2018 | Cabrera-Cordon et al. |
| 2018/0077250 A1 | 3/2018 | Prasad et al. |
| 2018/0097910 A1 | 4/2018 | D'Agostino et al. |
| 2018/0114234 A1 | 4/2018 | Fighel |
| 2018/0121766 A1 | 5/2018 | Mccord et al. |
| 2018/0137472 A1 | 5/2018 | Gorzela et al. |
| 2018/0137555 A1 | 5/2018 | Clausse et al. |
| 2018/0146093 A1 | 5/2018 | Kumar et al. |
| 2018/0150749 A1 | 5/2018 | Wu et al. |
| 2018/0152558 A1 | 5/2018 | Chan et al. |
| 2018/0165062 A1 | 6/2018 | Yoo et al. |
| 2018/0165691 A1 | 6/2018 | Heater et al. |
| 2018/0165692 A1 | 6/2018 | McCoy |
| 2018/0165723 A1 | 6/2018 | Wright et al. |
| 2018/0174198 A1 | 6/2018 | Wilkinson et al. |
| 2018/0189273 A1 | 7/2018 | Campos et al. |
| 2018/0190144 A1 | 7/2018 | Corelli et al. |
| 2018/0198917 A1 | 7/2018 | Ristock et al. |
| 2018/0205825 A1 | 7/2018 | Vymenets et al. |
| 2018/0248818 A1 | 8/2018 | Zucker et al. |
| 2018/0260857 A1 | 9/2018 | Kar et al. |
| 2018/0285423 A1 | 10/2018 | Ciano et al. |
| 2018/0286000 A1 | 10/2018 | Berry et al. |
| 2018/0293327 A1 | 10/2018 | Miller et al. |
| 2018/0293532 A1 | 10/2018 | Singh et al. |
| 2018/0300295 A1 | 10/2018 | Maksak et al. |
| 2018/0300641 A1 | 10/2018 | Donn et al. |
| 2018/0308072 A1 | 10/2018 | Smith et al. |
| 2018/0309801 A1 | 10/2018 | Rathod |
| 2018/0349858 A1 | 12/2018 | Walker et al. |
| 2018/0361253 A1 | 12/2018 | Grosso |
| 2018/0365651 A1 | 12/2018 | Sreedhara et al. |
| 2018/0367672 A1 | 12/2018 | Ristock et al. |
| 2018/0372486 A1 | 12/2018 | Farniok et al. |
| 2018/0376002 A1 | 12/2018 | Abraham |
| 2019/0013017 A1 | 1/2019 | Kang et al. |
| 2019/0028587 A1 | 1/2019 | Unitt et al. |
| 2019/0028588 A1 | 1/2019 | Shinseki et al. |
| 2019/0037077 A1 | 1/2019 | Konig et al. |
| 2019/0042988 A1 | 2/2019 | Brown et al. |
| 2019/0043106 A1 | 2/2019 | Talmor et al. |
| 2019/0058793 A1 | 2/2019 | Konig et al. |
| 2019/0104092 A1 | 4/2019 | Koohmarey et al. |
| 2019/0108834 A1 | 4/2019 | Nelson et al. |
| 2019/0130329 A1 | 5/2019 | Fama et al. |
| 2019/0132443 A1 | 5/2019 | Munns et al. |
| 2019/0146647 A1 | 5/2019 | Ramachandran et al. |
| 2019/0147045 A1 | 5/2019 | Kim |
| 2019/0172291 A1 | 6/2019 | Naseath |
| 2019/0180095 A1 | 6/2019 | Ferguson et al. |
| 2019/0180747 A1 | 6/2019 | Back et al. |
| 2019/0182383 A1 | 6/2019 | Shaev et al. |
| 2019/0196676 A1 | 6/2019 | Hillis et al. |
| 2019/0197568 A1 | 6/2019 | Li et al. |
| 2019/0205389 A1 | 7/2019 | Tripathi et al. |
| 2019/0236205 A1 | 8/2019 | Jia et al. |
| 2019/0238680 A1 | 8/2019 | Narayanan et al. |
| 2019/0253553 A1 | 8/2019 | Chishti |
| 2019/0258825 A1 | 8/2019 | Krishnamurthy |
| 2019/0287517 A1 | 9/2019 | Green et al. |
| 2019/0295027 A1 | 9/2019 | Dunne et al. |
| 2019/0306315 A1 | 10/2019 | Portman et al. |
| 2019/0335038 A1 | 10/2019 | Alonso Y Caloca et al. |
| 2019/0341030 A1 | 11/2019 | Hammons et al. |
| 2019/0342450 A1 | 11/2019 | Kulkarni et al. |
| 2019/0349477 A1 | 11/2019 | Kotak |
| 2019/0377789 A1 | 12/2019 | Jegannathan et al. |
| 2019/0378076 A1 | 12/2019 | O'Gorman et al. |
| 2019/0385597 A1 | 12/2019 | Katsamanis et al. |
| 2019/0386917 A1 | 12/2019 | Malin |
| 2019/0392357 A1 | 12/2019 | Surti et al. |
| 2019/0394333 A1 | 12/2019 | Jiron et al. |
| 2020/0005375 A1 | 1/2020 | Sharan et al. |
| 2020/0007680 A1 | 1/2020 | Wozniak |
| 2020/0012697 A1 | 1/2020 | Fan et al. |
| 2020/0012992 A1 | 1/2020 | Chan et al. |
| 2020/0019893 A1 | 1/2020 | Lu |
| 2020/0028968 A1 | 1/2020 | Mendiratta et al. |
| 2020/0050788 A1 | 2/2020 | Feuz et al. |
| 2020/0050996 A1 | 2/2020 | Generes, Jr. et al. |
| 2020/0058299 A1 | 2/2020 | Lee et al. |
| 2020/0076947 A1 | 3/2020 | Deole |
| 2020/0097544 A1 | 3/2020 | Alexander et al. |
| 2020/0104801 A1 | 4/2020 | Kwon et al. |
| 2020/0118215 A1 | 4/2020 | Rao et al. |
| 2020/0119936 A1 | 4/2020 | Balasaygun et al. |
| 2020/0125919 A1 | 4/2020 | Liu et al. |
| 2020/0126126 A1 | 4/2020 | Briancon et al. |
| 2020/0134492 A1 | 4/2020 | Copeland |
| 2020/0134648 A1 | 4/2020 | Qi et al. |
| 2020/0137097 A1 | 4/2020 | Zimmermann et al. |
| 2020/0154170 A1 | 5/2020 | Wu et al. |
| 2020/0160870 A1 | 5/2020 | Baughman et al. |
| 2020/0175478 A1 | 6/2020 | Lee et al. |
| 2020/0193335 A1 | 6/2020 | Sekhar et al. |
| 2020/0193983 A1 | 6/2020 | Choi |
| 2020/0211120 A1 | 7/2020 | Wang et al. |
| 2020/0218766 A1 | 7/2020 | Yaseen et al. |
| 2020/0219500 A1 | 7/2020 | Bender et al. |
| 2020/0242540 A1 | 7/2020 | Rosati et al. |
| 2020/0250272 A1 | 8/2020 | Kantor et al. |
| 2020/0250557 A1 | 8/2020 | Kishimoto et al. |
| 2020/0257996 A1 | 8/2020 | London |
| 2020/0280578 A1 | 9/2020 | Hearty et al. |
| 2020/0280635 A1 | 9/2020 | Barinov et al. |
| 2020/0285936 A1 | 9/2020 | Sen |
| 2020/0329154 A1 | 10/2020 | Baumann et al. |
| 2020/0336567 A1 | 10/2020 | Dumaine |
| 2020/0342868 A1 | 10/2020 | Lou et al. |
| 2020/0351375 A1 | 11/2020 | Lepore et al. |
| 2020/0351405 A1 | 11/2020 | Pace |
| 2020/0357026 A1 | 11/2020 | Liu et al. |
| 2020/0364507 A1 | 11/2020 | Berry |
| 2020/0365148 A1 | 11/2020 | Ji et al. |
| 2020/0395008 A1 | 12/2020 | Cohen et al. |
| 2020/0410506 A1 | 12/2020 | Jones et al. |
| 2021/0004536 A1 | 1/2021 | Adibi et al. |
| 2021/0005206 A1 | 1/2021 | Adibi et al. |
| 2021/0042839 A1 | 2/2021 | Adamec |
| 2021/0056481 A1 | 2/2021 | Wicaksono et al. |
| 2021/0067627 A1 | 3/2021 | Delker et al. |
| 2021/0081869 A1 | 3/2021 | Zeelig et al. |
| 2021/0081955 A1 | 3/2021 | Zeelig et al. |
| 2021/0082417 A1 | 3/2021 | Zeelig et al. |
| 2021/0082418 A1 | 3/2021 | Zeelig et al. |
| 2021/0084149 A1 | 3/2021 | Zeelig et al. |

(56) References Cited

U.S. PATENT DOCUMENTS

| | | |
|---|---|---|
| 2021/0089762 A1 | 3/2021 | Rahimi et al. |
| 2021/0091996 A1 | 3/2021 | Mcconnell et al. |
| 2021/0105361 A1 | 4/2021 | Bergher et al. |
| 2021/0124843 A1 | 4/2021 | Vass et al. |
| 2021/0125275 A1 | 4/2021 | Adibi |
| 2021/0133763 A1 | 5/2021 | Adibi et al. |
| 2021/0133765 A1 | 5/2021 | Adibi et al. |
| 2021/0134282 A1 | 5/2021 | Adibi et al. |
| 2021/0134283 A1 | 5/2021 | Adibi et al. |
| 2021/0134284 A1 | 5/2021 | Adibi et al. |
| 2021/0136204 A1 | 5/2021 | Adibi et al. |
| 2021/0136205 A1 | 5/2021 | Adibi et al. |
| 2021/0136206 A1 | 5/2021 | Adibi et al. |
| 2021/0201244 A1 | 7/2021 | Sella et al. |
| 2022/0129905 A1 | 4/2022 | Sethumadhavan et al. |
| 2023/0007123 A1* | 1/2023 | Krucek .................. G06N 20/00 |

FOREIGN PATENT DOCUMENTS

| | | |
|---|---|---|
| WO | 2006/037836 A1 | 4/2006 |
| WO | 2012/024316 A2 | 2/2012 |
| WO | 2015/099587 A1 | 7/2015 |
| WO | 2019142743 A1 | 7/2019 |

OTHER PUBLICATIONS

Buesing et al., "Getting the Best Customer Service from your IVR: Fresh eyes on an old problem," [online] McKinsey and Co., published on Feb. 1, 2019, available at: < https://www.nnckinsey.conn/business-functions/operations/our-insights/ getting-the-best-customer-service-from-your-ivr-fresh-eyes . . . (Year: 2019).

Chiu et al., "A multi-agent infrastructure for mobile workforce management in a service oriented enterprise", Proceedings of the 38th annual Hawaii international conference on system sciences, IEEE, 2005, pp. 10.

Diimitrios et al., "An overview of workflow management: From process modeling to workflow automation infrastructure," Distributed and parallel Databases, 1995, vol. 3, No. 2 pp. 119-153.

Ernst et al. "An Annotated Bibliography of Personnel Scheduling and Rostering", CSIRO Mathematical and Information Sciences, 2003, 155 pages.

Ernst et al.,"Staff scheduling and rostering: A review of applications, methods and models," European Journal of Operational Research, 2004, vol. 153, pp. 3-27.

Federal Register, vol. 72, No. 195, Oct. 10, 2007, pp. 57526-57535.

Federal Register, vol. 75, No. 169, Sep. 1, 2010, pp. 53643-53660.

Federal register, vol. 79, No. 241 issued on Dec. 16, 2014, p. 74629, col. 2, *Gottschalk v. Benson*.

Federal Register, vol. 84, No. 4, Jan. 7, 2019, pp. 50-57.

Federal Register, vol. 84, No. 4, Jan. 7, 2019, p. 53-55.

Grefen et al., "A reference architecture for workflow management systems", Data & Knowledge Engineering, 1998, vol. 27, No. 1, pp. 31-57.

Signed Aug. 20, 2010.

Huang et al., "Agent-based workflow management in collaborative product development on the Internet", Computer-Aided Design, 2000, vol. 32, No. 2, pp. 133-144.

Janarthanam, "Hands on Chatbots and conversational UI development: Build chatbots and voice user interfaces with Chatfuel, Dialogflow, Microsoft Bot Framework, Twilio, and Alexa Skills" Dec. 2017.

Myers et al., "At the Boundary of Workflow and AI", Proc. AAAI 1999 Workshop on Agent-Based Systems in the Business Context, 1999, 09 pages.

Niven, "Can music with prosocial lyrics heal the working world? A field intervention in a call center." Journal of Applied Social Psychology, 2015; 45(3), 132-138. doi:10.1111/jasp.12282 ).

On Hold Marketing, "Growing Your Business with Customized on-Hold Messaging" (Published on Apr. 5, 2018 at https://adhq.com/about/ad-news/growing-your-business-with-customized-on-hold-messaging) (Year: 2018).

U.S. Appl. No. 16/668,214, NFOA mailed Nov. 10, 2021.

U.S. Appl. No. 16/668,215, NFOA mailed Dec. 7, 2021.

Van Den Bergh et al. "Personnel scheduling: A literature review", European journal of operational research, 2013, vol. 226, No. 3 pp. 367-385.

United States Patent and Trademark Office, Non-Final Office Action for U.S. Appl. No. 16/550,961 dated Mar. 2, 2020.

United States Patent and Trademark Office, Final Office Action for U.S. Appl. No. 16/550,961 dated Jun. 17, 2020.

Aldor-Noiman et al., "Workload forecasting for a call center: Methodology and a case study", The Annals of Applied Statistics, vol. 3, No. 4, 2009, pp. 1403-1447.

Koole et al., "An overview of routing and staffing algorithms in multi-skill customer contact centers", 2006, 43 pages.

Krishnan, Krish, "Data Warehousing in the Age of Big Data", Morgan Kaufmann, Chapter 5, 2013, 28 pages.

Gaietto, Molly., "What is Customer DNA?",—NGDATA Product News, Oct. 27, 2015, 10 pages.

Fan et al., "Demystifying Big Data Analytics for Business Intelligence Through the Lens of Marketing Mix", Big Data Research, vol. 2, Issue 1, Mar. 1, 2015, 16 pages.

An et al,, Towards Automatic Persona Generation Using Social Media Aug. 1, 2016, 2016 IEEE 4th International Conference on Future Internet of Things and Cloud Workshops (FiCloudW), 2 pages.

Bean-Mellinger, Barbara., "What Is the Difference Between Marketing and Advertising?", available on Feb. 12, 2019, retrieved from https://smallbusiness.chron .com/difference-between-marketing-advertising-2504 7 .html, Feb. 12, 2019, 6 pages.

Twin, Alexandra., "Marketing", URL: https://www.investopedia.com/lerms/m/marketing.asp, Mar. 29, 2019, 5 pages.

dictionary.com, "Marketing", URL: https://www.dictionary.com/browse/marketing, Apr. 6, 2019, 7 pages.

Ponn et al., "Correlational Analysis between Weather and 311 Service Request Volume", eil.mie.utoronto.ca., Jan. 1, 2017, 16 pages.

Zhang et al., "A Bayesian approach for modeling and analysis of call center arrivals", Jan. 1, 2013 Winter Simulations Conference (WSC), ieeexplore.ieee.org, pp. 713-723.

Mehrotra et al., "Call Center Simulation Modeling: Methods, Challenges, and Opportunities", Proceedings of the 2003 Winter Simulation Conference, vol. 1, Jan. 1, 2003, pp. 135-143.

Mandelbaum et al., "Staffing Many-Server Queues with Impatient Customers: Constraint Satisfaction in Call Center", Operations Research, Sep.-Oct. 2009, vol. 57, No. 5 (Sep. 1-Oct. 2009), pp. 1189-1205.

Fukunaga et al., "Staff Scheduling for Inbound Call Centers and Customer Contact Centers", AI Magazine, Winter, vol. 23, No. 4, Jan. 1, 2002, pp. 30-40.

Feldman et al., "Staffing of Time-Varying Queues to Achieve Time-Stable Performance", Management Science, Feb. 1, 2008, vol. 54, No. 2, Call Center Management, pp. 324-338.

Business Wire, "Rockwell SSD announces Call Center Simulator", Feb. 4, 1997, 4 pages.

Nathan, Stearns., "Using skills-based routing to the advantage of your contact center", Customer Inter@ction Solutions, Technology Marketing Corporation, May 1, 2001, vol. 19 No. 11, pp. 54-56.

* cited by examiner

METHOD AND APPARATUS FOR AUTOMATED QUALITY MANAGEMENT OF COMMUNICATION RECORDS

BACKGROUND

Contact centers, also referred to as "call centers", in which agents are assigned to queues based on skills and customer requirements are well known. FIG. 1 is an example system architecture 100, of a cloud-based contact center infrastructure solution. Customers 110 interact with a contact center 150 using voice, email, text, and web interfaces to communicate with the agents 120 through a network 130 and one or more of text or multimedia channels. The platform that controls the operation of the contact center 150 including the routing and handling of communications between customers 110 and agents 120 for the contact center 150 is referred herein as the contact routing system 153. The contact routing system 153 could be any of a contact center as a service (CCaS) system, an automated call distributor (ACD) system, or a case system, for example.

The agents 120 may be remote from the contact center 150 and handle communications (also referred to as "interactions" herein) with customers 110 on behalf of an enterprise. The agents 120 may utilize devices, such as but not limited to, work stations, desktop computers, laptops, telephones, a mobile smartphone and/or a tablet. Similarly, customers 110 may communicate using a plurality of devices, including but not limited to, a telephone, a mobile smartphone, a tablet, a laptop, a desktop computer, or other. For example, telephone communication may traverse networks such as a public switched telephone networks (PSTN), Voice over Internet Protocol (VoIP) telephony (via the Internet), a Wide Area Network (WAN) or a Large Area Network (LAN). The network types are provided by way of example and are not intended to limit types of networks used for communications.

The agents 120 may be assigned to one or more queues representing call categories and/or agent skill levels. The agents 120 assigned to a queue may handle communications that are placed in the queue by the contact routing system 153. For example, there may be queues associated with a language (e.g., English or Chinese), topic (e.g., technical support or billing), or a particular country of origin. When a communication is received by the contact routing system 153, the communication may be placed in a relevant queue, and one of the agents 120 associated with the relevant queue may handle the communication.

The agents 120 of a contact center 150 may be further organized into one or more teams. Depending on the embodiment, the agents 120 may be organized into teams based on a variety of factors including, but not limited to, skills, location, experience, assigned queues, associated or assigned customers 110, and shift. Other factors may be used to assign agents 120 to teams.

Entities that employ workers such as agents 120 typically use a Quality Management (QM) system to ensure that the agents 120 are providing customers 110 with a high-quality product or service. QM systems do this by determining when and how to evaluate, train, and coach each agent 120 based on seniority, team membership, or associated skills as well as quality of performance while handling customer 110 interactions. QM systems may further generate and provide surveys or questionnaires to customers 110 to ensure that they are satisfied with the service being provided by the contact center 150.

Historically, QM forms are built by adding multiple choice questions where different choices are worth different point values. The forms are then filled out manually by evaluators based on real time or recorded monitoring of agent interactions with customers. For example, a form for evaluating support interactions might start with a question where the quality of the greeting is evaluated. A good greeting where the agent introduced themselves and inquired about the problem might be worth 10 points and a poor greeting might be worth 0, with mediocre greetings being somewhere in between on the 1-10 scale. There might be 3 more questions about problem solving, displaying empathy, and closing. Forms can also be associated with one or more queues (also sometimes known as "ring groups"). As noted above, a queue can represent a type of work that the support center does and/or agent skills. For example, a call center might have a tier 1 voice support queue, a tier 2 voice support queue, an inbound sales queue, an outbound sales queue, and a webchat support queue. With traditional quality management based on multiple choice question forms filled outs by evaluators, it is time prohibitive to evaluate every interaction for quality and compliance. Instead, techniques like sampling are used where a small percent of each agent's interactions are monitored by and evaluator each month. This results in a less than optimum quality management process because samples are, of course, not always fully representative of an entire data set.

SUMMARY

Disclosed implementations leverage known methods of speech recognition and intent analysis to make corrections to inputs to be fed into an Artificial Intelligence (AI) model to be used for quality management scoring of communications. An AI model can be used to detect the intent of utterances that are passed to it. The AI model can be trained based on "example utterances" and then compare the passed utterances, from agent/customer interactions to the training data to determine intent with a specified level (e.g., expressed as a score) of confidence. Intent determinations with a low confidence score can be directed to a human for further review. A first aspect of the invention is a method for assessing communications between a user and an agent in a call center, the method comprising: extracting text from a plurality of communications between a call center user and a call center agent to thereby create a communication record; for each of the plurality of communications: assessing the corresponding text of a communication record by applying an AI assessment model to obtain an intent assessment of one or more aspects of the communication, wherein the AI assessment model is developed by processing a set of initial training data and supplemental training data, wherein the supplemental training data is based on reviewing manual corrections to previous assessments by the assessment model.

BRIEF DESCRIPTION OF THE DRAWING

The foregoing summary, as well as the following detailed description of the invention, will be better understood when read in conjunction with the appended drawings. For the purpose of illustrating the invention, there are shown in the drawings various illustrative embodiments. It should be understood, however, that the invention is not limited to the precise arrangements and instrumentalities shown. In the drawings.

DETAILED DESCRIPTION

Certain terminology is used in the following description for convenience only and is not limiting. Unless specifically set forth herein, the terms "a," "an" and "the" are not limited to one element but instead should be read as meaning "at least one." The terminology includes the words noted above, derivatives thereof and words of similar import.

Disclosed implementations overcome the above-identified disadvantages of the prior art by adapting contact center QM analysis to artificial intelligence systems. Disclosed implementations can leverage known methods of speech recognition and intent analysis to make corrections to inputs to be fed into an Artificial Intelligence (AI) model to be used for quality management scoring of communications. Matches with a low confidence score can be directed to a human for further review. Evaluation forms that are similar to forms used in conventional manual systems can be used. Retraining of the AI model is accomplished through individual corrections in an ongoing manner, as described below, as opposed to providing a new set of training data.

Disclosed implementations use automated transcription and intent detection and an AI model to evaluate every interaction, i.e. communication, (or alternatively a large percentage of interactions) between an agent and a customer. Disclosed implementations can leverage the evaluation flow used for manual evaluations so that the evaluators can correct the AI evaluations when appropriate. Based on such corrections, the AI model can be retrained to accommodate specifics of the business and center—resulting in more confidence in the AI model over time.

Figure 2:
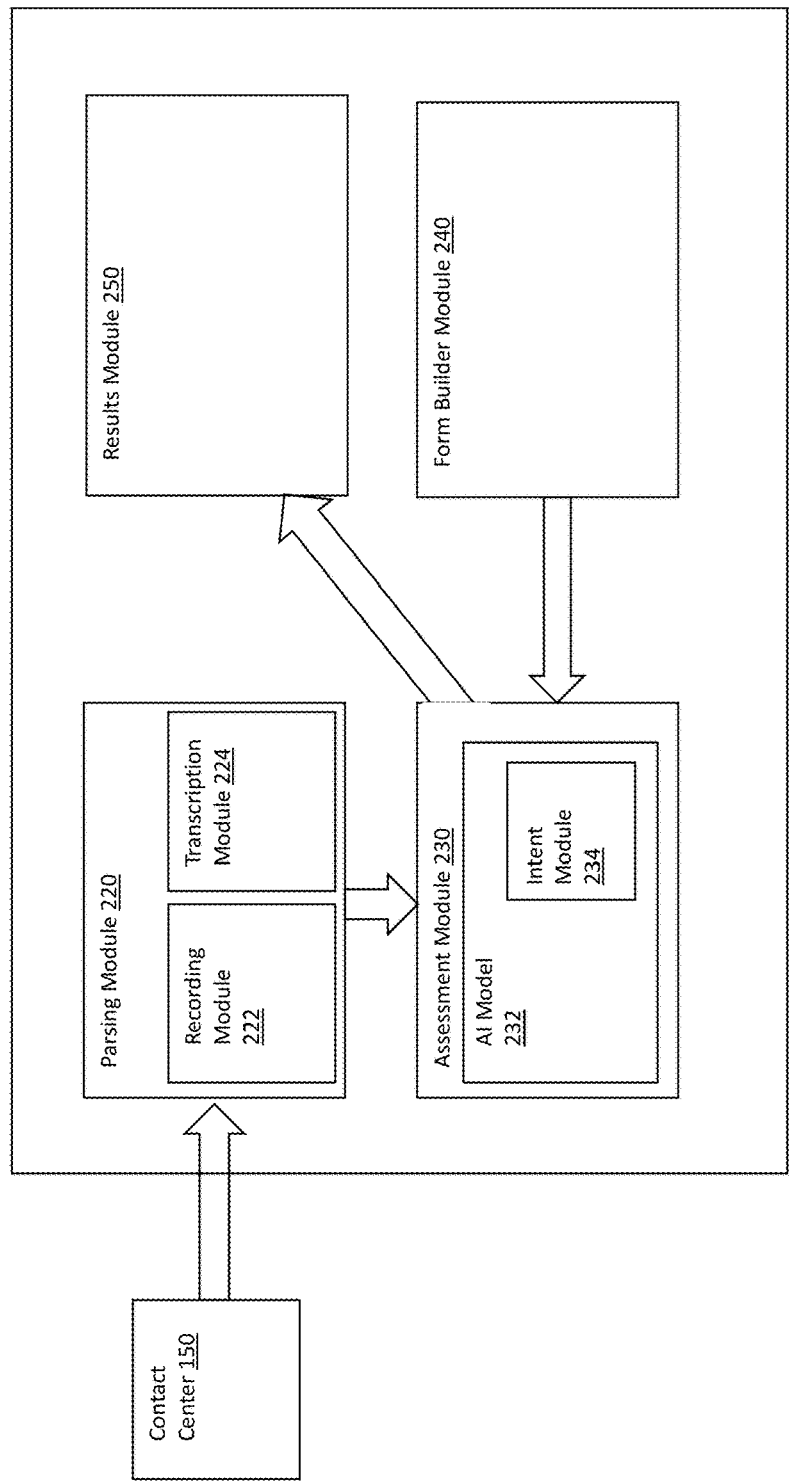
FIG. 2 is a schematic representation of a computer system for quality management in accordance with disclosed implementations.

FIG. 2 illustrates a computer system for quality management in accordance with disclosed implementations. System 200 in includes parsing module 220 (including recording module 222 and transcription module 224) which parses words and phrases from communications/interactions for processing in the manner descried in detail below. Assessment module 232 includes Artificial Intelligence (AI) model 232, which includes intent module 234 that determines intent of and scores interactions in the manner described below. Intent module 234 can leverages any one of many known intent engines to analyze transcriptions of transcription module 224. Form builder module 240 includes user interfaces and processing elements for building AI enabled evaluation forms as described below. Results module 250 includes user interfaces and processing elements for presenting scoring results of interactions individually and in aggregate form. The interaction of these modules will become apparent based on the description below. The modules can be implemented through computer-executable code stored on non-transient media and executed by hardware processors to accomplish the disclosed functions which are described in detail below.

Figure 3:
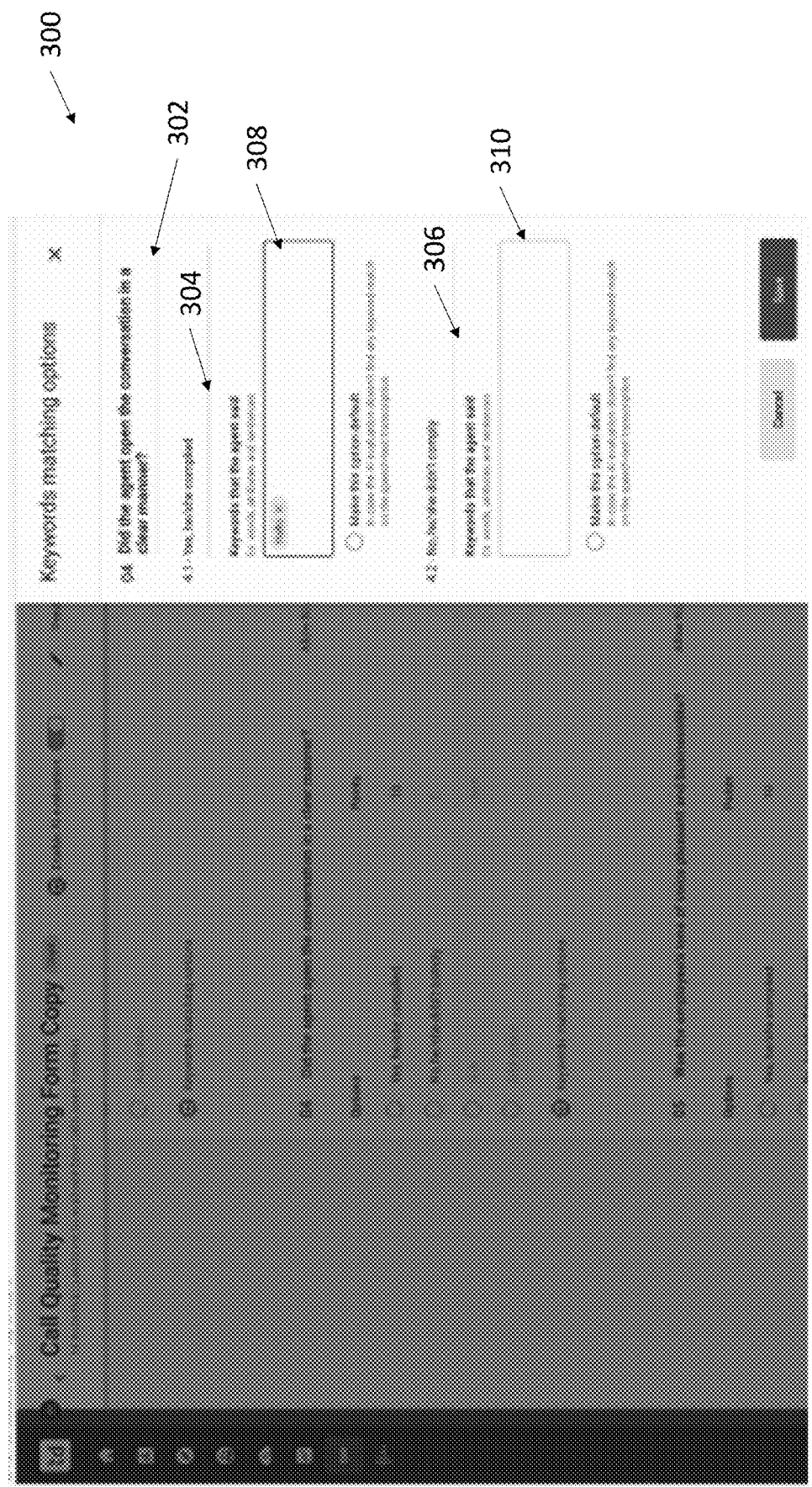
FIG. 3 is an example of a QM form creation user interface in accordance with disclosed implementations.

As noted above, conventional QM forms are built by adding multiple choice questions where different choices are worth different point values. For example, a form for evaluating support interactions might start with a question where the quality of the greeting is evaluated. A good greeting where the agent introduced themselves and inquired about the problem might be worth 10 points and a poor greeting might be worth 0. There might be additional questions in the form relating to problem solving, displaying empathy, and closing. As noted above, forms can also be associated with one or more queues FIG. 3 illustrates a user interface 300 of a computer-implemented form generation tool, such as form builder module 240 (FIG. 2) in accordance with disclosed implementations. User interface 300 can be used to enable forms for AI evaluation. A user can navigate the UI to select a question at drop down menu 302 for example, specify answer choices at 304 and 306, and specify one or more examples of utterances, with corresponding scores and/or weightings, for each answer choice, in text entry box 304 for example. As an example, assuming the question "Did the agent greet the caller properly?" is selected in 302, and the answers provided at 304 and 306 are "Yes" and "No" respectively, words/phrases "hello my name is", "good morning", "thank you for calling our helpline" can be entered into text box 308 as indications of "Yes" (i.e., a proper greeting) and words/phrases The word/phrase "fallback" can then be added to answer choice "No" in box 308 meaning that it will be selected in the absence of a positive match for the "Yes" keywords/phrases (i.e. a "Yes" intent was not detected or the confidence threshold is below acceptable level).

Form templates can be provided with the recommended best practice for sections, questions, and example utterances for each answer choice in order to maximize matching and increase confidence level. Customer users (admins) can edit the templates in accordance with their business needs. Additionally, users can specify a default answer choice which will be selected if none of the example utterances were detected with high confidence. In the example above, "no greeting given" might be a default answer choice, with 0 points, if a greeting is not detected. When an AI evaluation form created through UI 300 is saved, the example utterances are used to train AI model 232 (FIG. 1) with an intent for every question choice. In the example above, AI model 232 might have 8 intents: good greeting, poor greeting, good problem solving, poor problem solving, good empathy, poor empathy, good closing, poor closing, for example.

Figure 4:
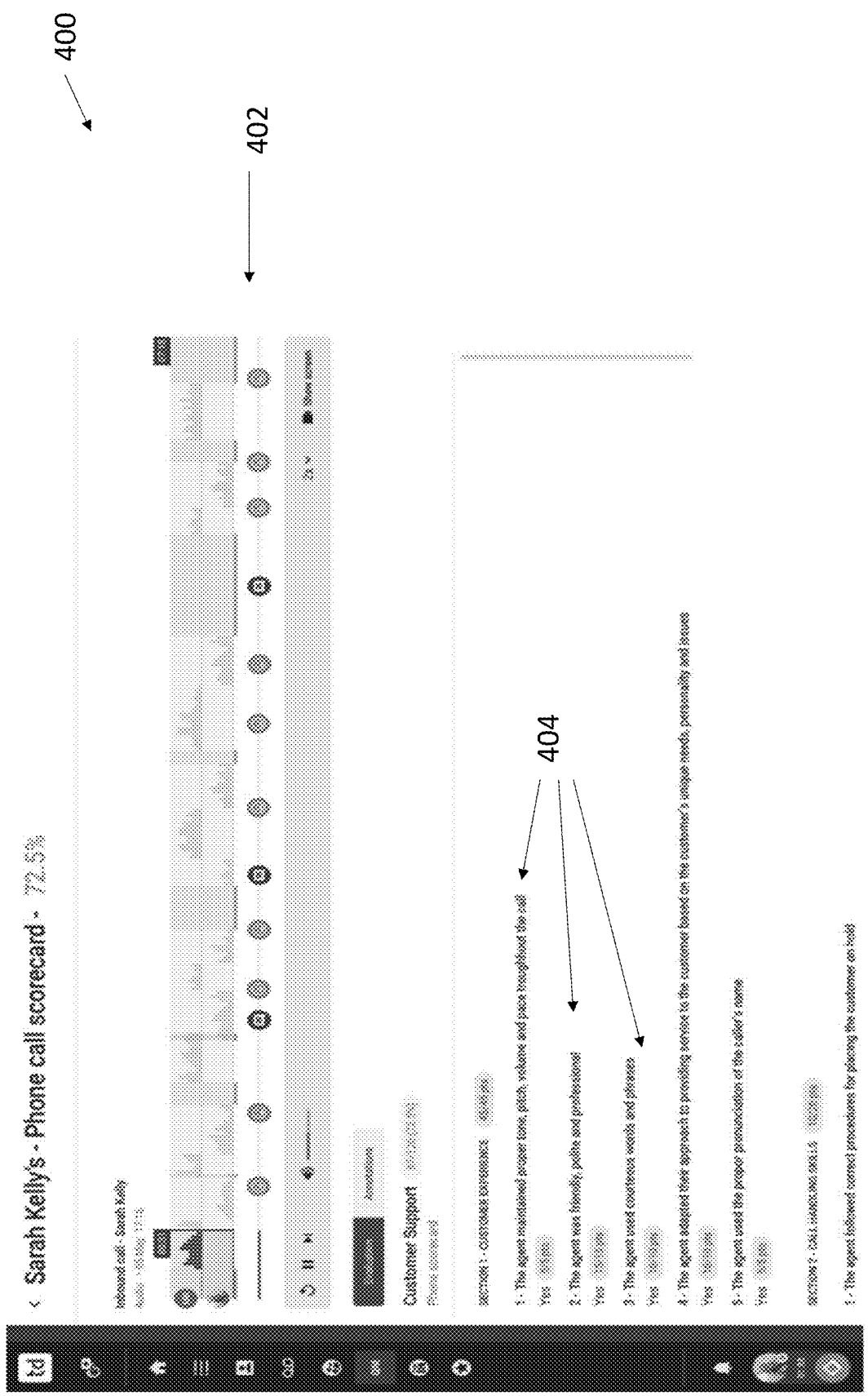
FIG. 4 is an example of aa user interface showing choices detected in interactions based on the questions in an evaluation form in accordance with disclosed implementations.

When a voice interaction is completed, an audio recording of the interaction, created by recording module 222 (FIG. 2) can be sent to a speech transcription engine of transcription module 224 (FIG. 2) and the resulting transcription is stored in a digital file store. When the transcription is available, a message can be sent and the transcription can be processed by an intent detection engine on intent module 234 (FIG. 2). Utterances in the transcription can be enriched via intent detection by intent module 234. An annotation, such as one or more tags, can be associated with the interaction as shown in FIG. 4 which illustrates user interface 400 and the positive or negative choices detected in the interaction being processed based on the questions in the evaluation form created with user interface 300 of FIG. 3. As shown at 402, annotations can be associated with portions of the interaction to indicate detected intent during that portion of the interaction. For example, the annotations can be green happy faces (for positive intent), red happy faces (for negative intent), and grey speech bubbles (where there wasn't a height confidence based on the automated analysis). The corresponding positive or negative choices for the interaction, as evaluated by the AI model 232, and the corresponding questions, are indicated at 404. The tags can indicate intent, the question and choice associated with that intent, and whether that choice was positive, negative, or low confidence.

Figure 1:
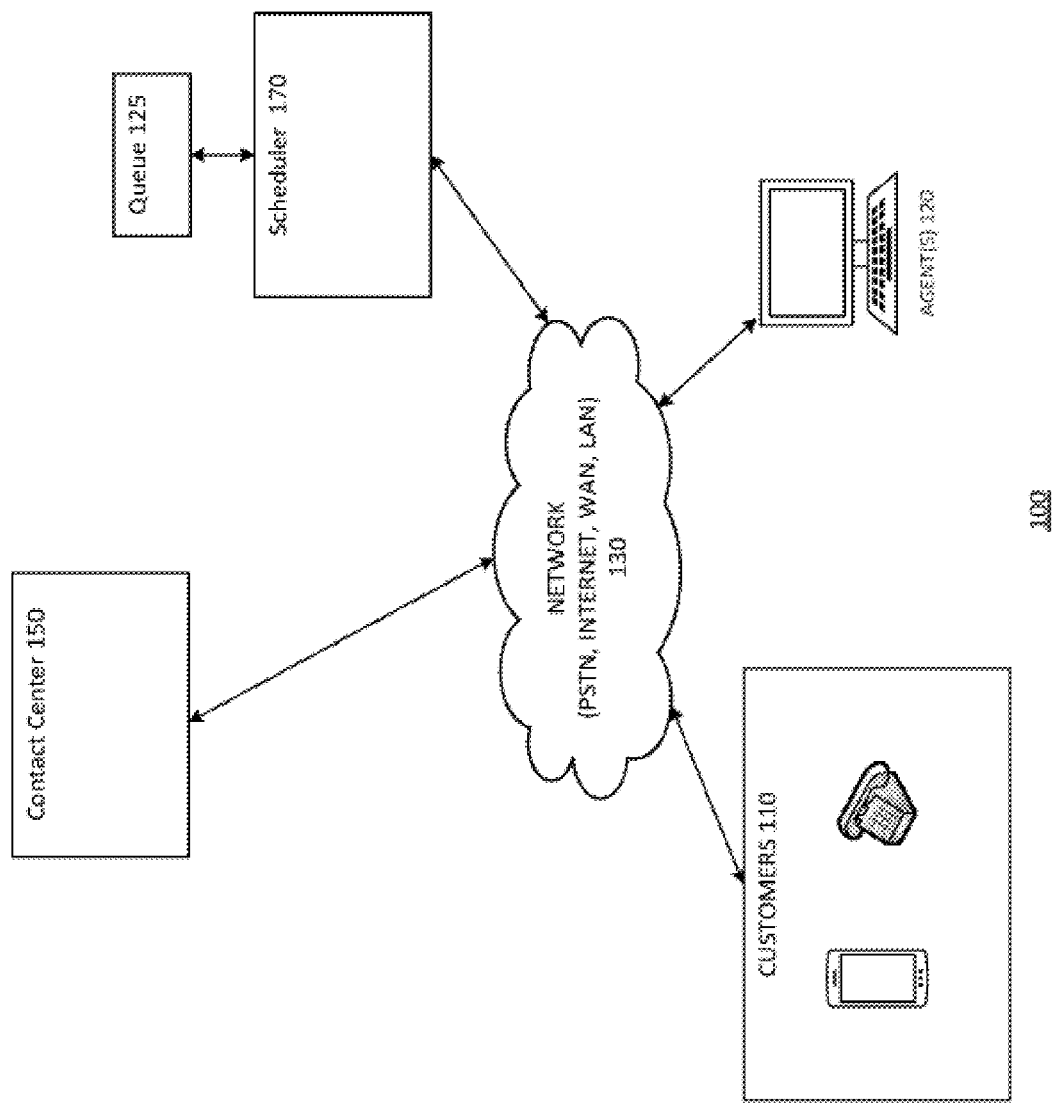
FIG. 1 is a schematic representation of a call center architecture.

Based on the positive or negative choices, a new evaluation of the corresponding interaction will be generated for the agent, by assessment module 230 of FIG. 1, with a score. For example, the score can be based on a percentage of the points achieved from the detected choices with respect to the total possible score. If both positive and negative problem solving examples are detected, then the question can be assigned as the negative option (i.e., the one worth fewer points), for example, as it might be desirable for the system to err on the side of caution and detection of potential issues. As an alternative, disclosed implementations might look for a question option that has a medium number of points and use that as the point score for the utterances. Based on these positive and negative annotations detected automatically by assessment module 230, the corresponding rating will be calculated on the evaluation form itself for that particular section. If for some questions, no intent is found with a high confidence, the default answer voice can be be selected. If for some questions, intents are found, but a low confidence level, those low confidence matches will be annotated and the form can be presented to users as pending for manual review.

Figure 5:
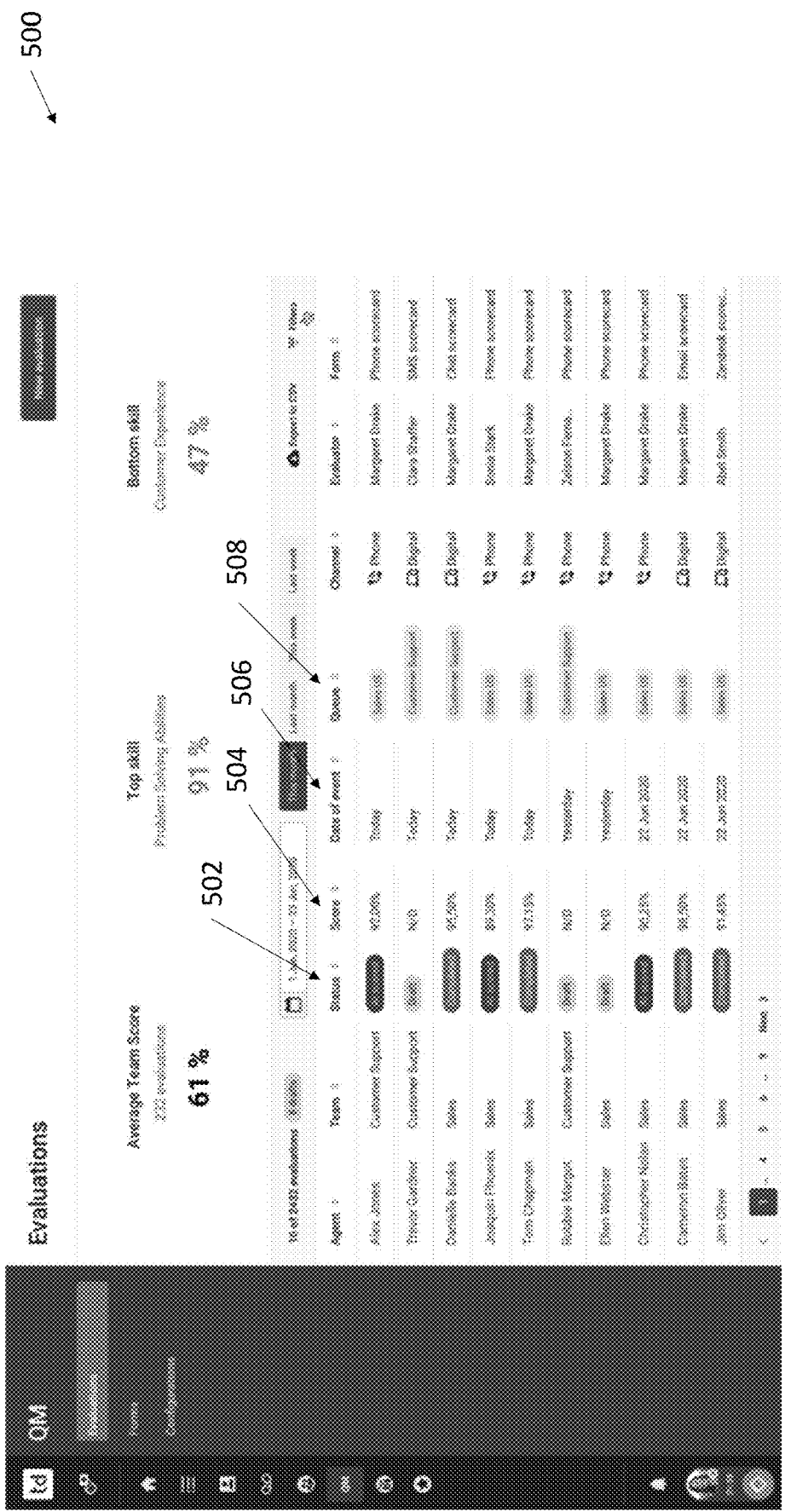
FIG. 5 is an example of evaluations page user interface in accordance with disclosed implementations.

Evaluations accomplished automatically by assessment module 230 are presented to the user on an evaluations page user UI 500 or results module 250 as shown in FIG. 5. Each evaluation can be tagged as "AI Scored", "AI Pending", "Draft" or "Completed", in column 502, to differentiate them from forms that were manually "Completed" by an evaluator employee. In this example, Draft means the evaluation was partially filled in by a person, AI Pending means the evaluation was partially filled in by the AI but there were some answers with low confidence, AI Scored means the evaluation was completely filled in by the AI, and Completed means the evaluation was completely filled in by a person or reviewed and updated by a person after it was AI Pending or AI Scored.

Of course, other relevant data, such as Score (column 504), date of the interaction (column 506), queue associated with the interaction (column 508), and the like can be presented on evaluations page UI 500. Additionally, the average score, top skill, and bottom skill widgets (all results of calculations by assessment module 230 or results module 250) at the top of UI 500 could be based on taking the AI evaluations into account at a relatively low weighting (only 10% for example) as computer to forms completed manually by an evaluator employee. This weight may be configurable by the user.

Figure 6:
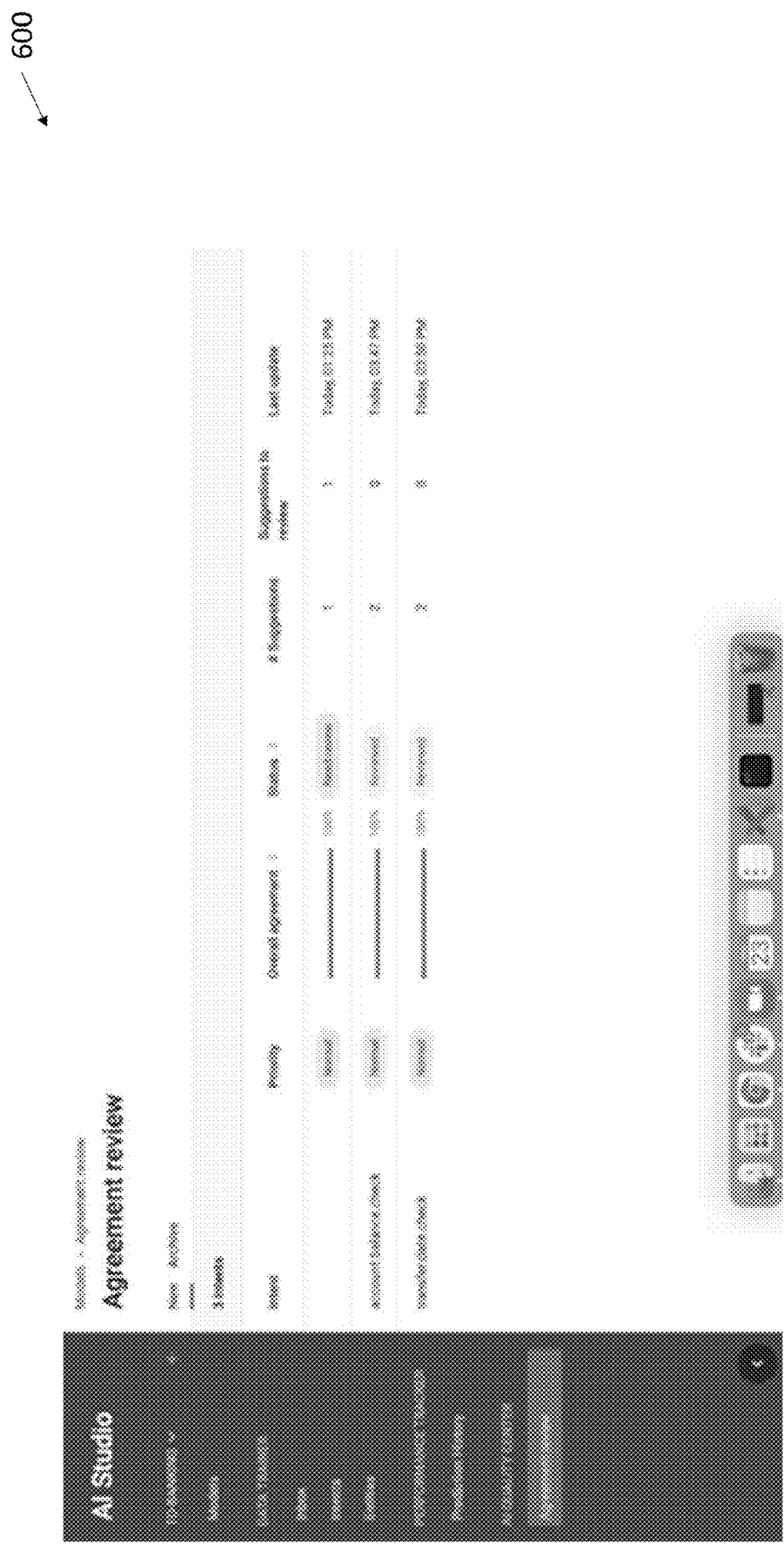
FIG. 6 is an example of an agreements review page user interface in accordance with disclosed implementations.

When an AI form cannot be evaluated automatically and scored completely by the system (e.g., the intent/answer cannot be determined on one or more particular questions), then these evaluations will show in an AI Pending state in column 504 of FIG. 5 and can be designated to require manual intervention/review/correction to move to a Completed status. Users can review these AI Pending evaluations and update the question responses selected on them. Doing this converts the evaluation to the "Completed" state where they are given the full weight (same as the ones completed manually from the start). Users can also choose to review and update the AI Scored evaluation, but this is an optional step which would only occur if, for example, a correction was needed. Updates that the employee evaluator made can be sent to a corrections API of AI model 232. The corrections can be viewed on a user interface, e.g., a UI similar to UI 300 of FIG. 3, and a non AI expert, such as a contact center agent or administrator, can view the models and corrections and can choose to add the example utterance to the intent that should have been selected, or to ignore the correction. If multiple trainers all agree to add an utterance, the new training set will be tested against past responses in an Agreements Review page of the UI 600 shown in FIG. 6, and, if the AI model identifies all of them correctly, an updated model will be published and used for further analysis. As a result of this process, the training set grows and the AI model improves over time.

The UI can provide a single view into corrections from multiple systems that use intent detection enrichment. For example, incorrect classifications from a virtual agent or knowledge base search could also be reviewed on the UI. Real-time alerts can be provided based on real-time transcription and intent detection to notify a user immediately if an important question is being evaluated poorly by AI model 232. Emotion/crosstalk/silence checks can be added to the question choices on the forms in addition to example utterances. For example, for the AI model to detect Yes, it might have to both match the Yes intent via the example utterances and have a positive emotion based on word choice and tone.

Figure 7:
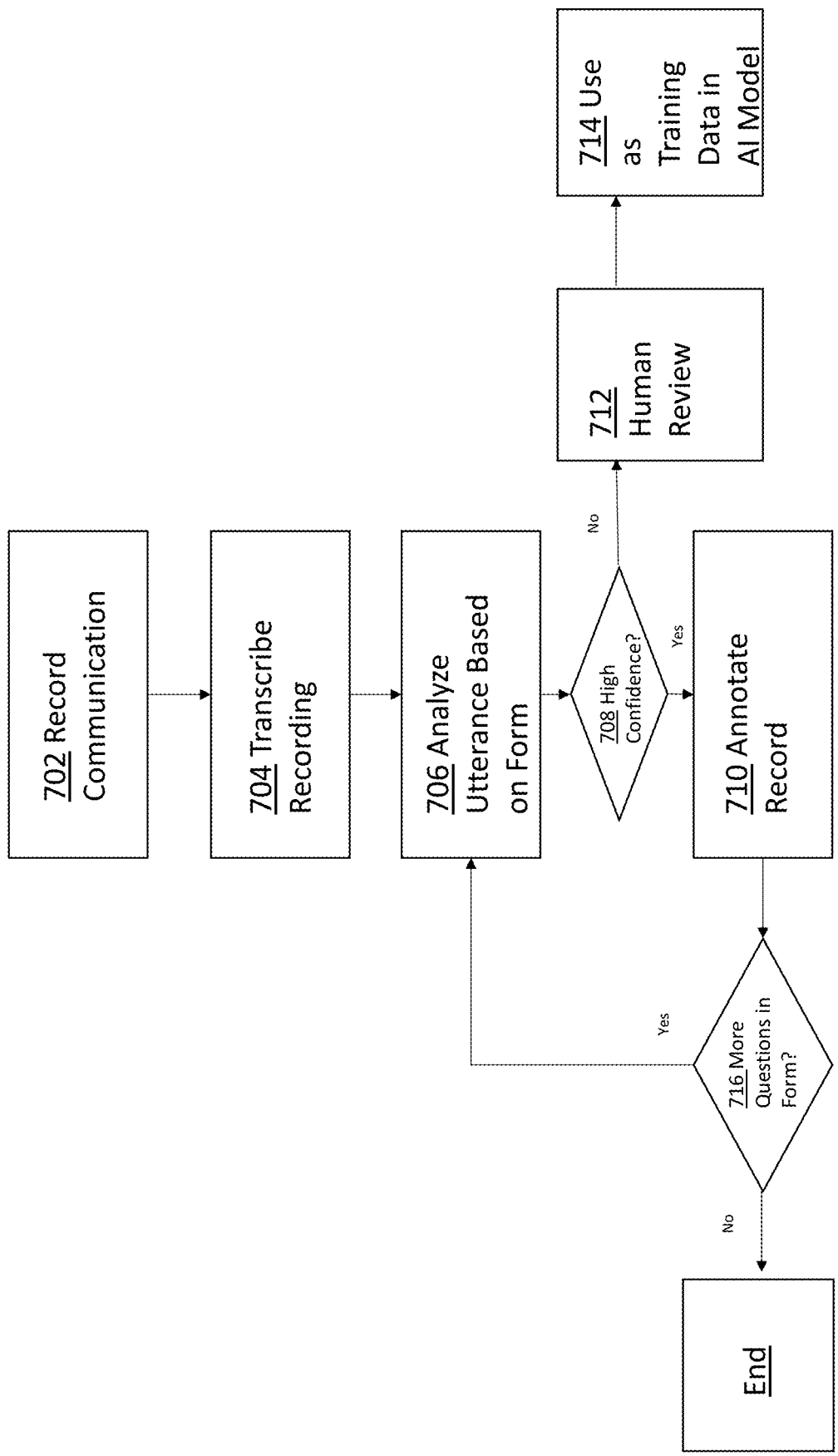
FIG. 7 is a flowchart of a method for quality management of agent interactions in accordance with disclosed implementations.

FIG. 7 illustrates a method in accordance with disclosed implementations. At 702, a call center communication, such as a phone call is recorded (by recording module 22 of FIG. 3, for example). At 704, the recording is transcribed into digital format using known transcription techniques (by transcription module 224 of FIG. 2, for example). At 706, each utterance is analyzed by an AI model (such as AI model 232 of FIG. 2) based on the appropriate form to determine intent and a corresponding confidence level of the determined intent for a question on the form. At 708, if intent is detected with a high confidence (based on a threshold intent score for example), then the intent is annotated in a record associated with the communication at 710. If the intent is found with a low confidence, the intent determination is marked for human review at 712 and the results of the human review are sent back to the AI model as training data at 714. As noted above, the human review can include review by multiple persons and aggregating the responses of the multiple persons. Steps 706, 708 and 710 (and 712 and 714 when appropriate) are repeated for each question in the form based on the determination made at 716.

The reviewing user/trainer can be an agent. Corrections from multiple systems/models can be presented in the same UI view that can be used for each model. other elements of system architecture 100 (FIG. 1) can be used to make suggestions to the AI model that get fed into trainer (by being flagged as a suggestion), for transcription and/or intent, during workflow in the course of normal operations. Clustering of label collections from call transcripts can be selected and included in training. For example, "gday mate" could be a greeting that is not included in model originally but is added based on its use in the normal workflow of the call center.

The elements of the disclosed implementations can include computing devices including hardware processors and memories storing executable instructions to cause the processor to carry out the disclosed functionality. Numerous other general purpose or special purpose computing system environments or configurations may be used. Examples of well-known computing systems, environments, and/or configurations that may be suitable for use include, but are not limited to, personal computers, servers, handheld or laptop devices, multiprocessor systems, microprocessor-based systems, network personal computers (PCs), minicomputers, mainframe computers, embedded systems, distributed computing environments that include any of the above systems or devices, and the like. Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

The computing devices can include a variety of tangible computer readable media. Computer readable media can be any available tangible media that can be accessed by device and includes both volatile and non-volatile media, removable and non-removable media. Tangible, non-transient computer storage media include volatile and non-volatile, and removable and non-removable media implemented in any method or technology for storage of information such as computer readable instructions, data structures, program modules or other data.

The various data and code can be stored in electronic storage devices which may comprise non-transitory storage media that electronically stores information. The electronic storage media of the electronic storage may include one or both of system storage that is provided integrally (i.e., substantially non-removable) with the computing devices and/or removable storage that is removably connectable to the computing devices via, for example, a port (e.g., a USB port, a firewire port, etc.) or a drive (e.g., a disk drive, etc.). The electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media.

Processor(s) of the computing devices may be configured to provide information processing capabilities and may include one or more of a digital processor, an analog processor, a digital circuit designed to process information, an analog circuit designed to process information, a state machine, and/or other mechanisms for electronically processing information. As used herein, the term "module" may refer to any component or set of components that perform the functionality attributed to the module. This may include one or more physical processors during execution of processor readable instructions, the processor readable instructions, circuitry, hardware, storage media, or any other components.

The contact center 150 of FIG. 1 can be in a single location or may be cloud-based and distributed over a plurality of locations, i.e. a distributed computing system. The contact center 150 may include servers, databases, and other components. In particular, the contact center 150 may include, but is not limited to, a routing server, a SIP server, an outbound server, a reporting/dashboard server, automated call distribution (ACD), a computer telephony integration server (CTI), an email server, an IM server, a social server, a SMS server, and one or more databases for routing, historical information and campaigns.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed:

1. A method for assessing communications between a user and an agent in a call center, the method comprising:
    extracting text from a plurality of communications between a call center user and a call center agent to thereby create a communication record;
    for each of the plurality of communications:
        assessing the corresponding text of a communication record by applying an AI assessment model to obtain an intent assessment of one or more aspects of the communication, wherein the AI assessment model is developed by processing a set of initial training data and supplemental training data to detect intents; and
        wherein the intent assessment includes a confidence score of the communication and further comprising flagging the communication record for manual quality management analysis and for making annotations if a confidence score of the intent assessment is below a threshold value.

2. The method of claim 1, wherein the intent assessment comprises multiple fields, each field having a value selected from a corresponding set of values and wherein the confidence level is based on a confidence sub-level determined for each value of each field.

3. The method of claim 2, wherein the fields and corresponding sets of values correspond to a human-readable form used for the manual annotation.

4. The method of claim 1, wherein the AI assessment model considers acceptable key words or phrases in each of a plurality of categories and the annotations include key words or phrases that are to be added to a category as acceptable.

5. The method of claim 1, where wherein the supplemental training data is added to the model based on reviewing manual corrections to previous assessments by the assessment model.

6. The method of claim 5, wherein the supplemental data is based on manual quality analysis by a plurality of people and determining consensus between the people.

7. The method of claim 1, wherein the manual quality management analysis and annotation is accomplished by an agent in the call center.

8. The method of claim 1, wherein the manual quality management analysis and annotation includes a user interface displaying suggestions that have been marked for training from multiple models.

9. The method of claim 8 wherein the suggestions have been marked for training based on lack of confidence or explicit suggestion.

10. The method of claim 8, wherein the suggestions come from a review of an unsupervised clustering model.

11. A computer system for assessing communications between a user and an agent in a call center, the system comprising:
    at least one computer hardware processor; and at least one memory device operatively coupled to the at least one computer hardware processor and having instructions stored thereon which, when executed by the at least one com put er hardware processor, cause the at least one com put er hardware processor to carry out the method of:

extracting text from a plurality of communications between a call center user and a call center agent to thereby create a communication record;

for each of the plurality of communications:

assessing the intent of corresponding text by applying an AI assessment model to obtain an intent assessment of the communication, wherein the AI assessment model is developed by processing a set of initial training data to detect intents; and wherein the intent assessment includes a confidence score of the communication and further comprising flagging the communication record for manual quality management analysis and for making annotations if a confidence level of the assessment is below a threshold score.

12. The system of claim 11 wherein each intent assessment comprises multiple fields, each field having a value selected from a corresponding set of values and wherein the confidence level is based on a confidence sub-level determined for each value of each field.

13. The system of claim 12, wherein the fields and corresponding sets of values correspond to a human-readable form used for the manual annotation.

14. The system of claim 11, wherein the AI assessment model considers acceptable key words or phrases in each of a plurality of categories and the annotations include key words or phrases that are to be added to a category as acceptable.

15. The system of claim 11, wherein supplemental training data is added to the model based on reviewing manual corrections to previous assessments by the assessment model.

16. The system of claim 15, wherein the supplemental training data is based on manual quality analysis by a plurality of people and determining consensus between the people.

17. The system of claim 11, wherein the manual quality management analysis and annotation is accomplished by an agent in the call center.

18. The system of claim 11, wherein the manual quality management analysis and annotation includes a user interface displaying suggestions that have been marked for training from multiple models.

19. The system of claim 18 wherein the suggestions have been marked for training based on lack of confidence or explicit suggestion.

20. The system of claim 18, wherein the suggestions come from a review of an unsupervised clustering model.

21. A method for assessing communications a contact center interaction, the method comprising:

receiving communication records relating to an interaction in a contact center, wherein each communication record includes text strings extracted from the corresponding communication and wherein each call record has been designated by an AI assessment model trained to accomplish an assessment of one or more aspects of the communication records, wherein the AI assessment model is developed by processing a set of initial training data;

for each communication record:

displaying at least one of the text strings on a user interface in correspondence with at least one AI intent assessment, wherein the AI intent assessment includes a confidence score of the communication and further comprising flagging the communication record for manual quality management analysis and for making annotations if a confidence level of the assessment is below a threshold score;

receiving, from a user, an assessment of the at least one text strings relating to the AI assessment;

updating the communication record based on the assessment to create an updated communication record; and applying the updated communication record to the AI assessment model as supplemental training data.

22. The method of claim 21, wherein the supplemental training data is based on manual quality analysis by a plurality of people and determining consensus between the people.

* * * * *